Aug. 7, 1956
W. J. HAESSLER
2,757,586
BOX WRAPPING MACHINE
Filed April 20, 1953
12 Sheets-Sheet 1
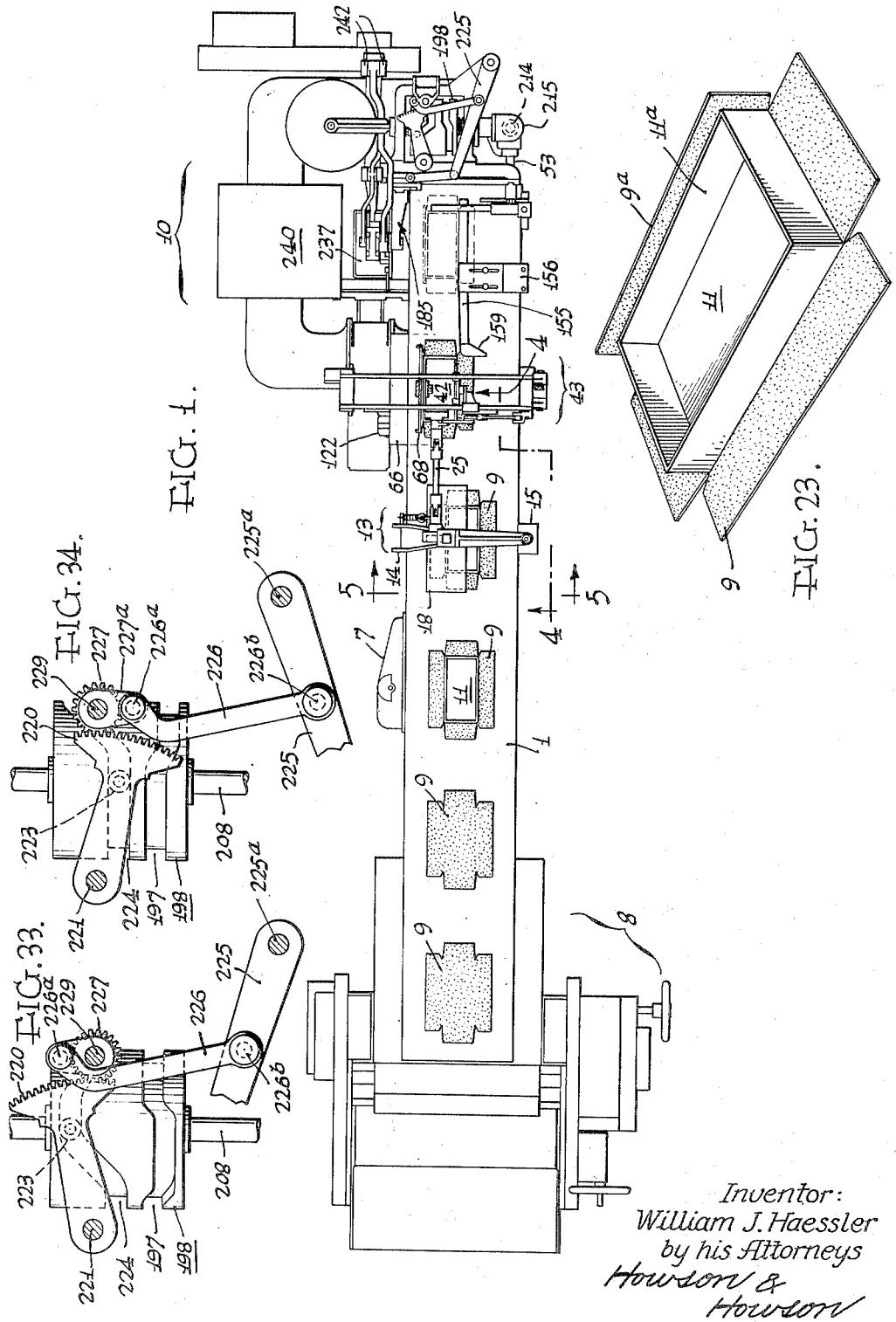
Inventor:
William J. Haessler
by his Attorneys
Howson &
Howson Aug. 7, 1956 W. J. HAESSLER 2,757,586
BOX WRAPPING MACHINE
Filed April 20, 1953 12 Sheets-Sheet 2
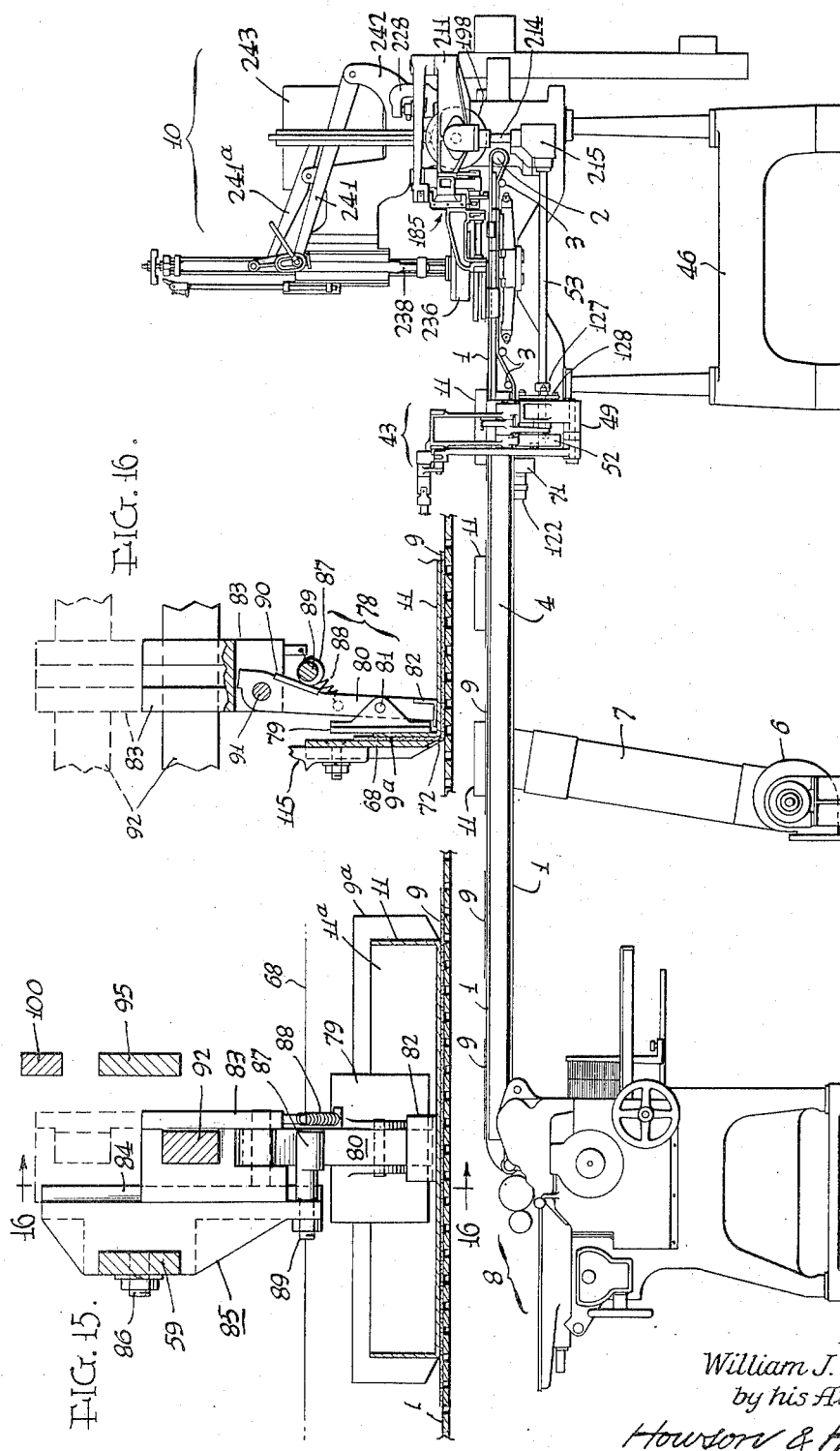
Inventor:
William J. Haessler
by his Attorneys
Howson & Howson

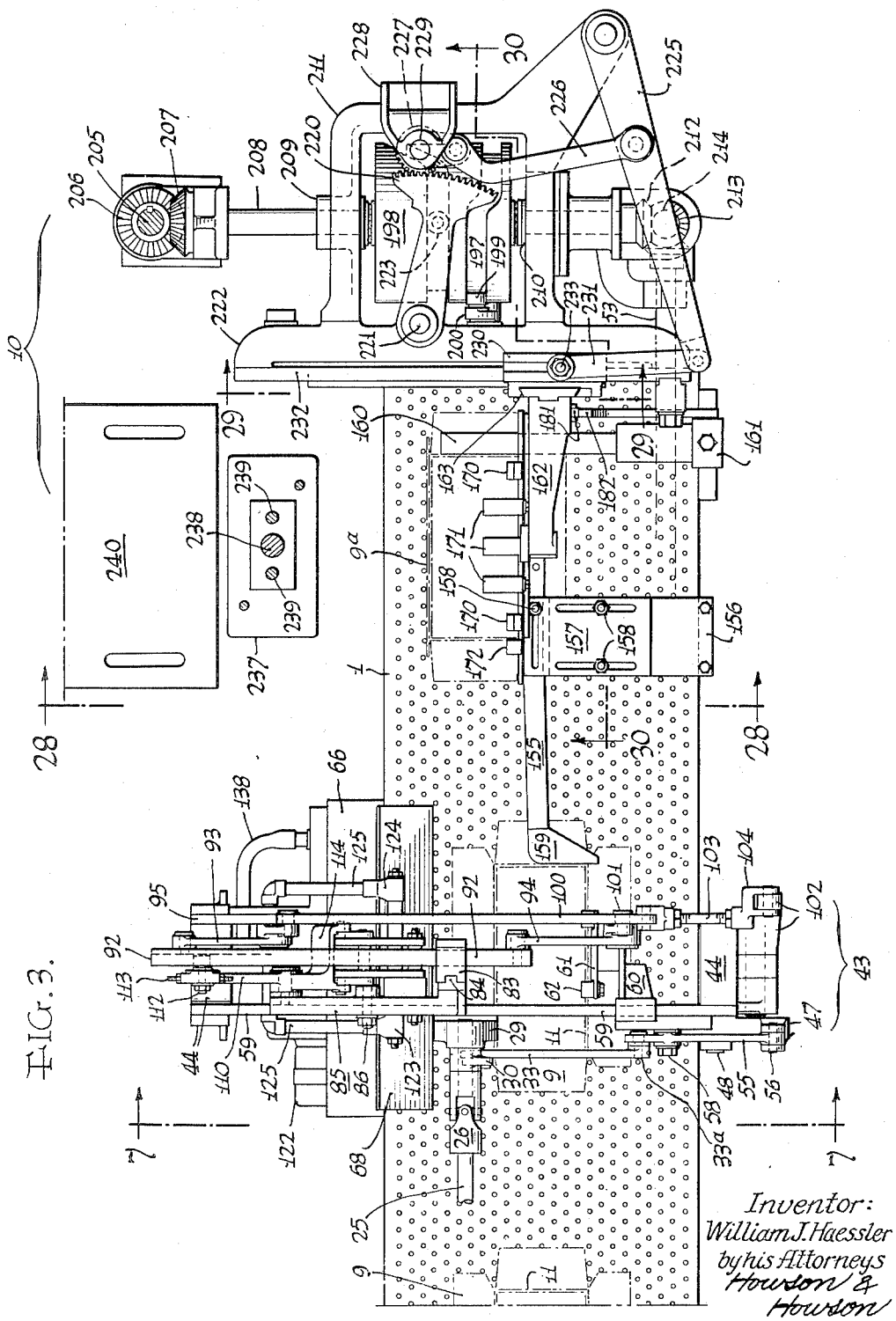

Aug. 7, 1956 W. J. HAESSLER 2,757,586
BOX WRAPPING MACHINE
Filed April 20, 1953 12 Sheets-Sheet 4
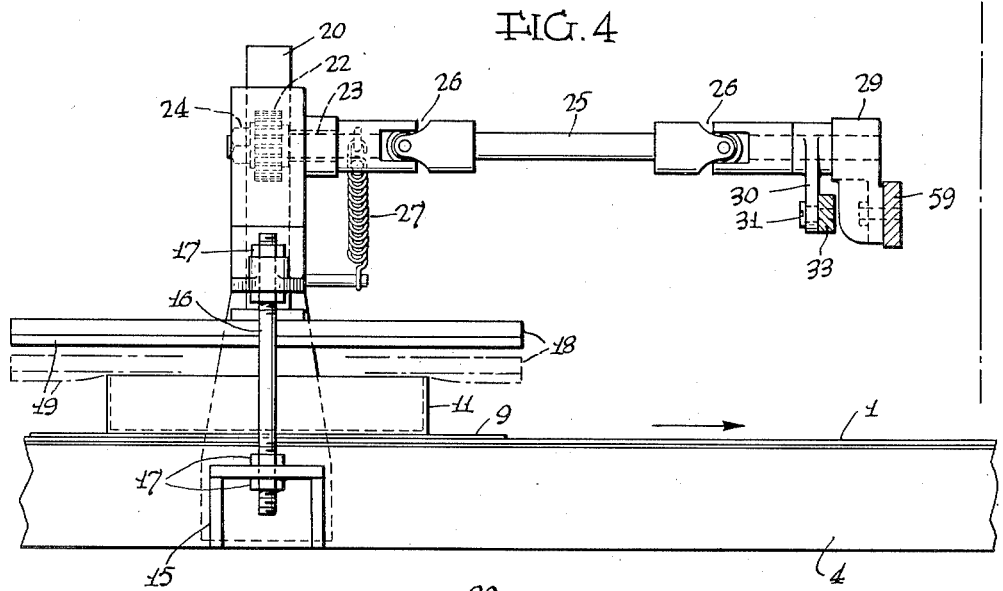
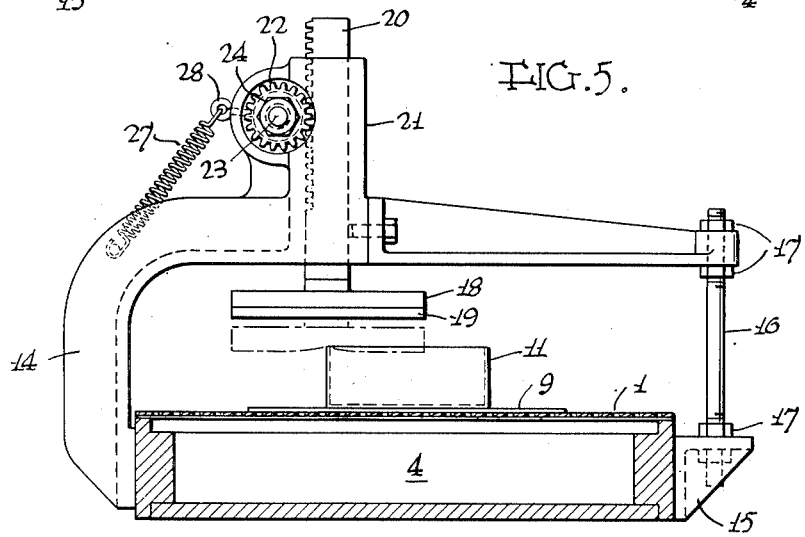
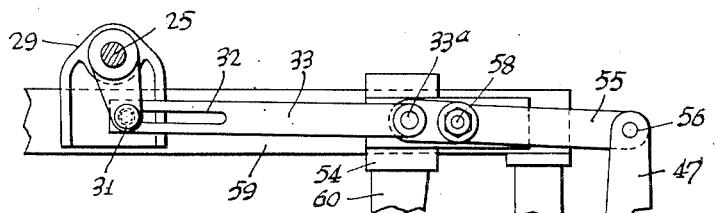
Inventor:
William J. Haessler
by his Attorneys
Howson &
Howson

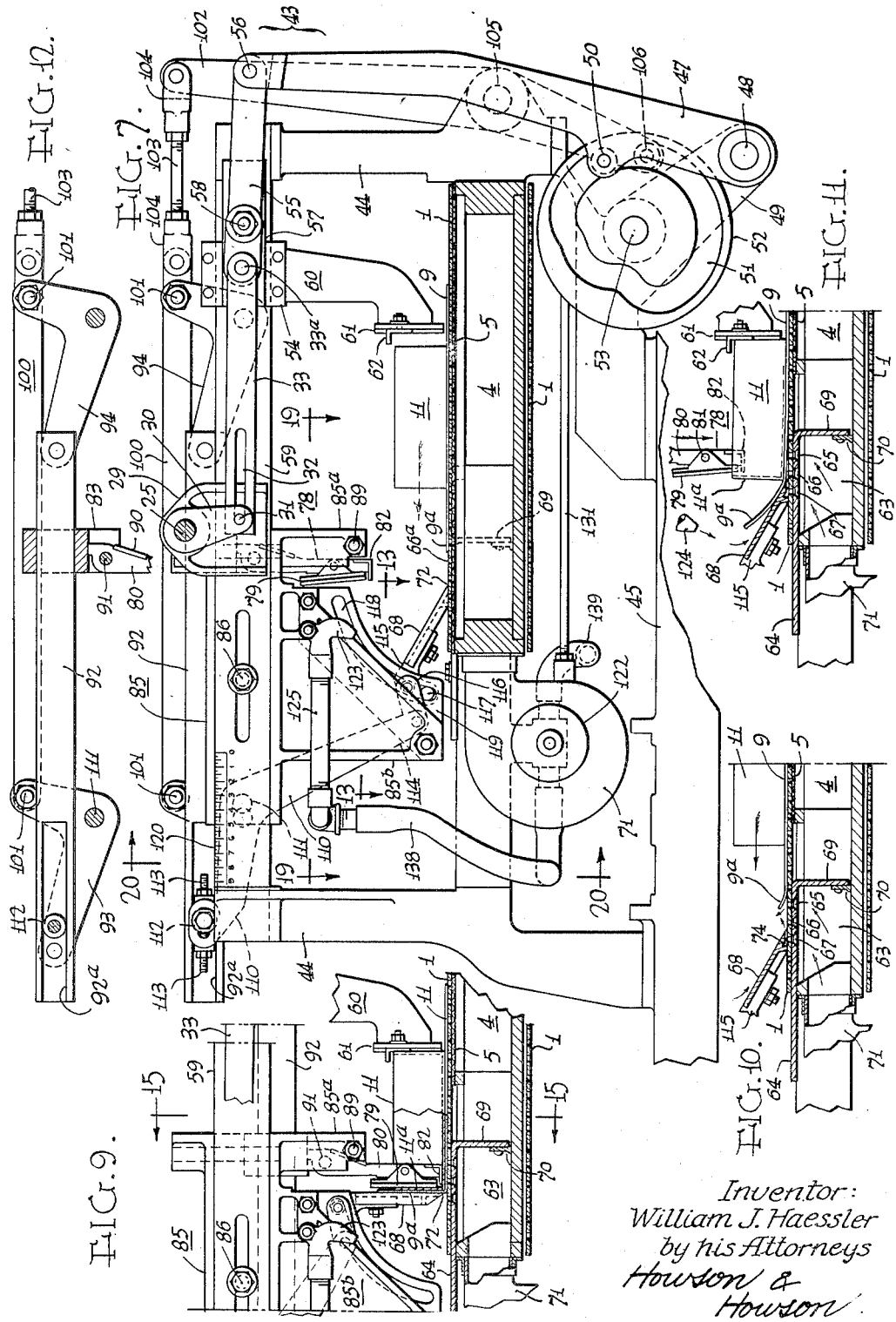

Aug. 7, 1956  W. J. HAESSLER  2,757,586
BOX WRAPPING MACHINE
Filed April 20, 1953  12 Sheets-Sheet 6
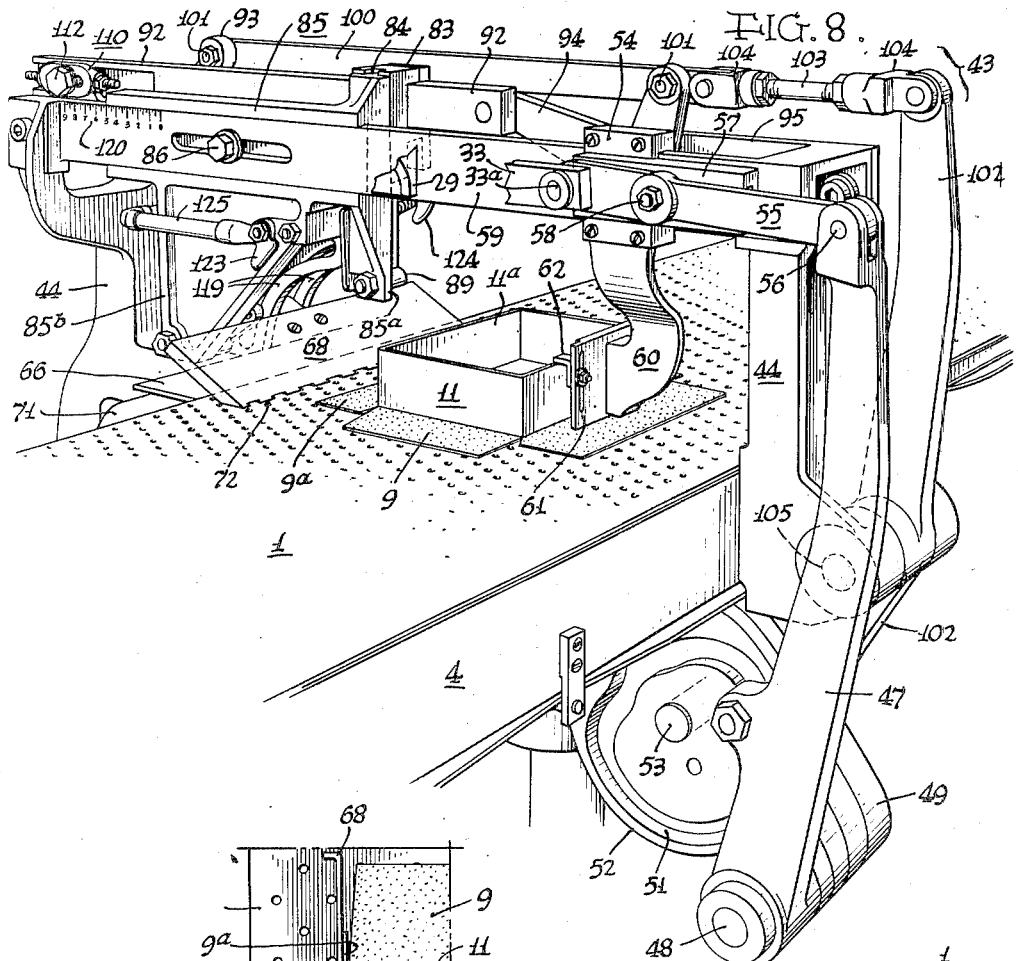
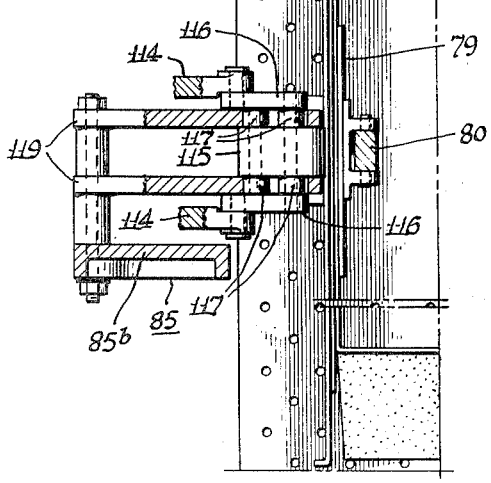
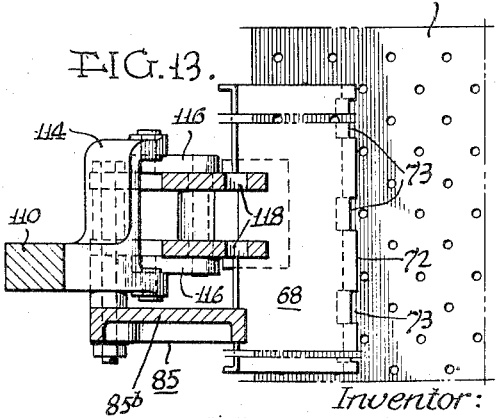
Inventor:
William J. Haessler
by his Attorneys
Howson &
Howson Aug. 7, 1956  W. J. HAESSLER  2,757,586
BOX WRAPPING MACHINE
Filed April 20, 1953  12 Sheets-Sheet 7
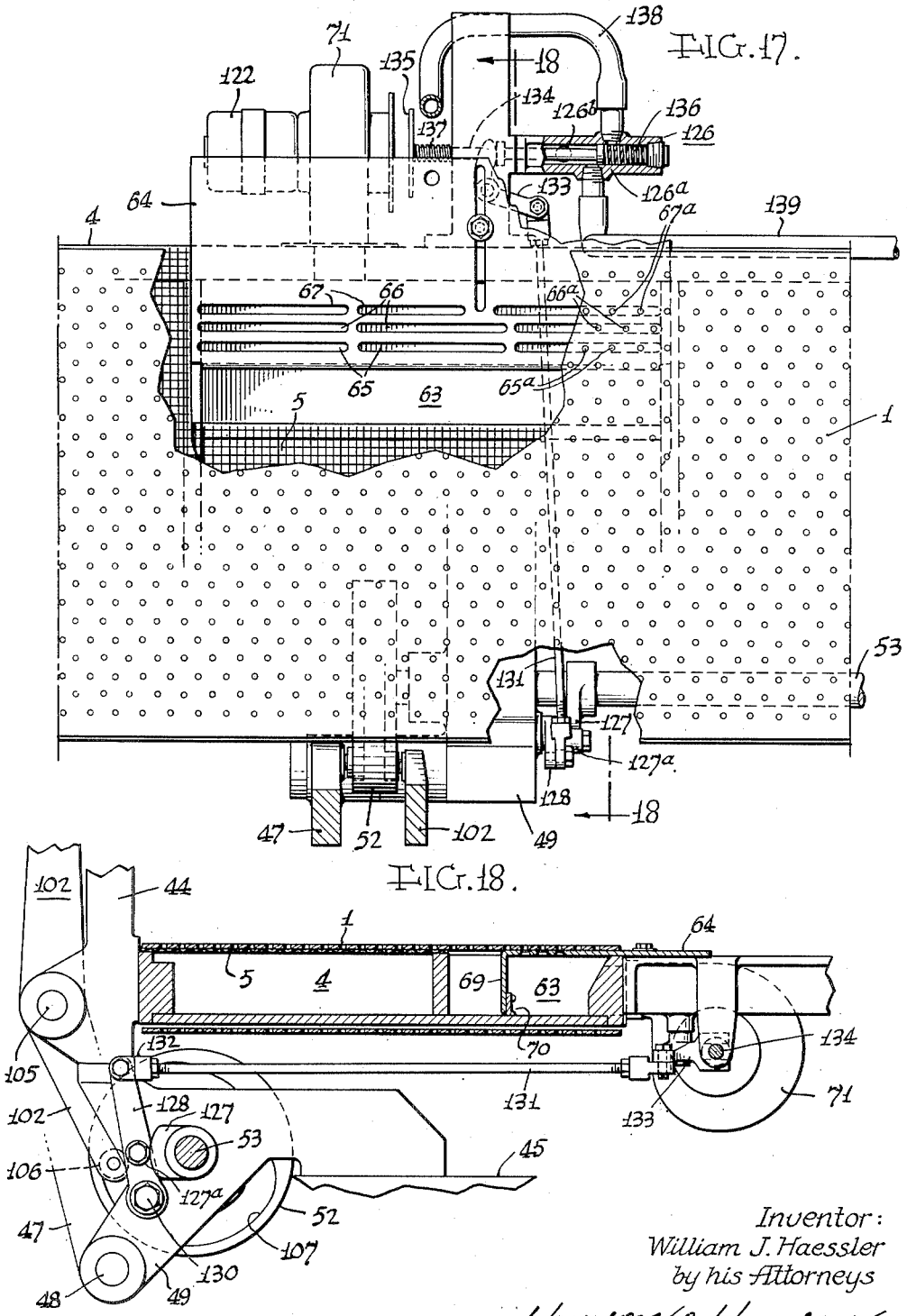
Inventor:
William J. Haessler
by his Attorneys
Howson & Howson

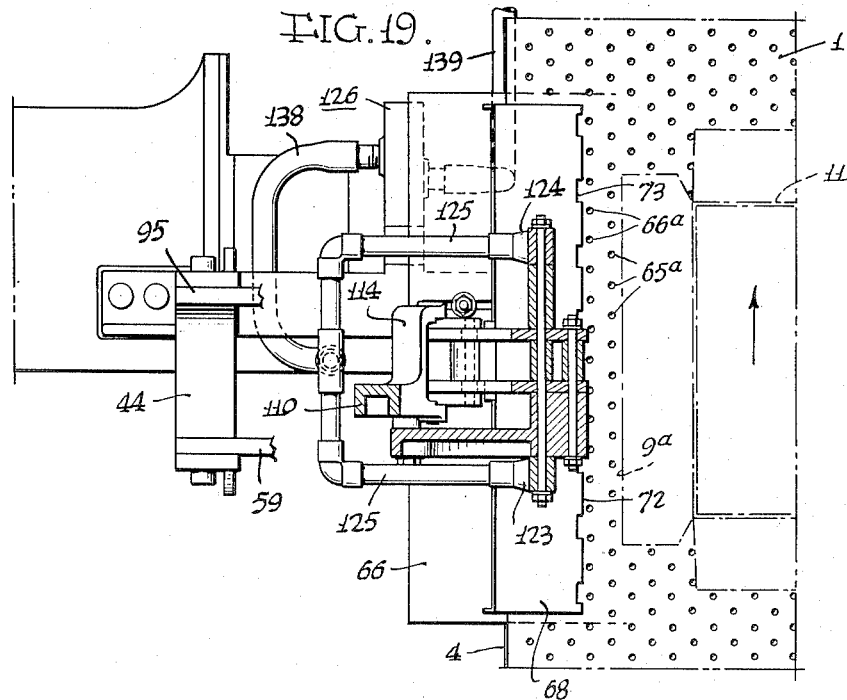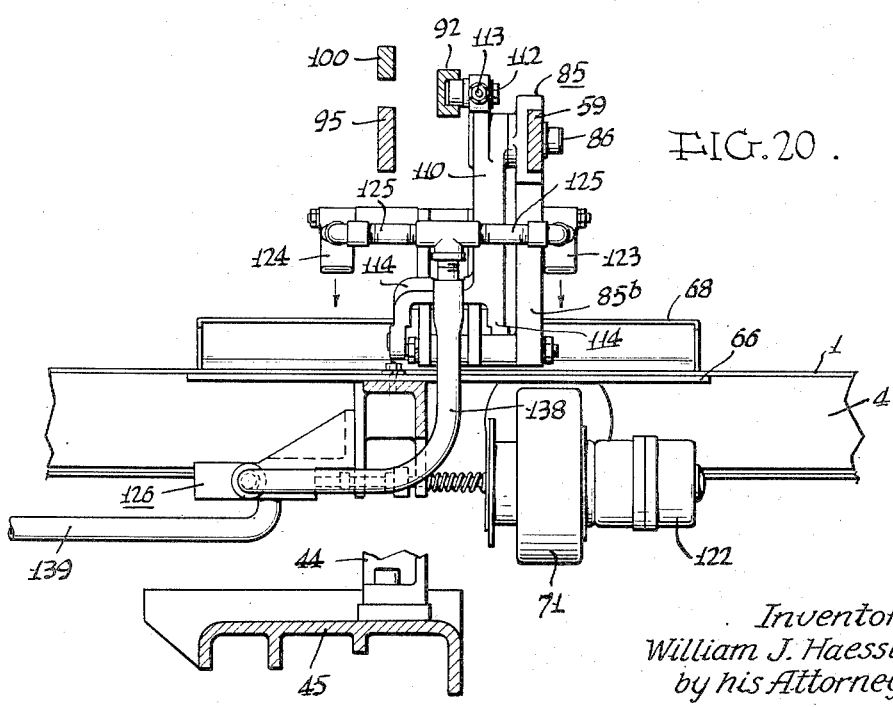

Aug. 7, 1956
W. J. HAESSLER
2,757,586
BOX WRAPPING MACHINE
Filed April 20, 1953
12 Sheets-Sheet 9
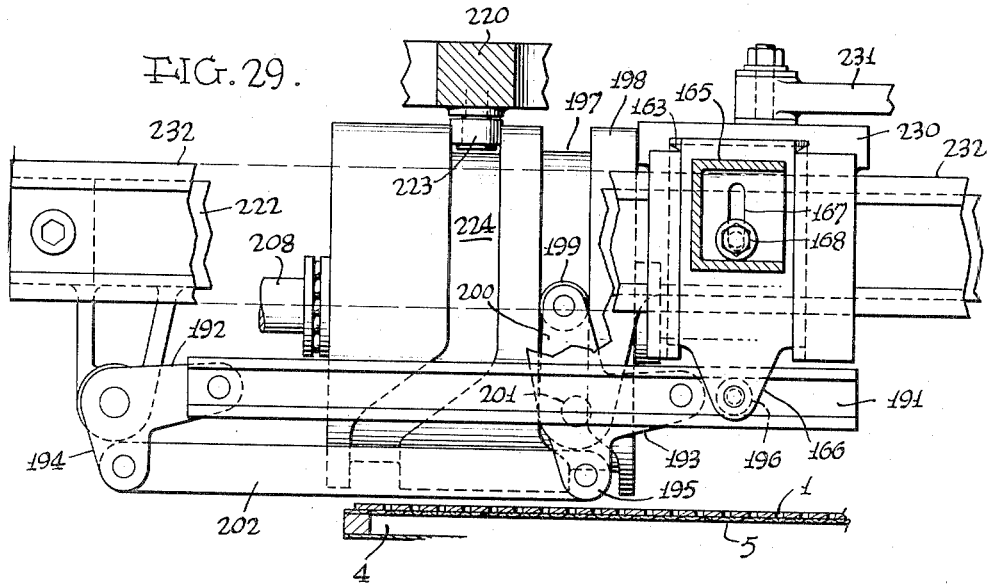
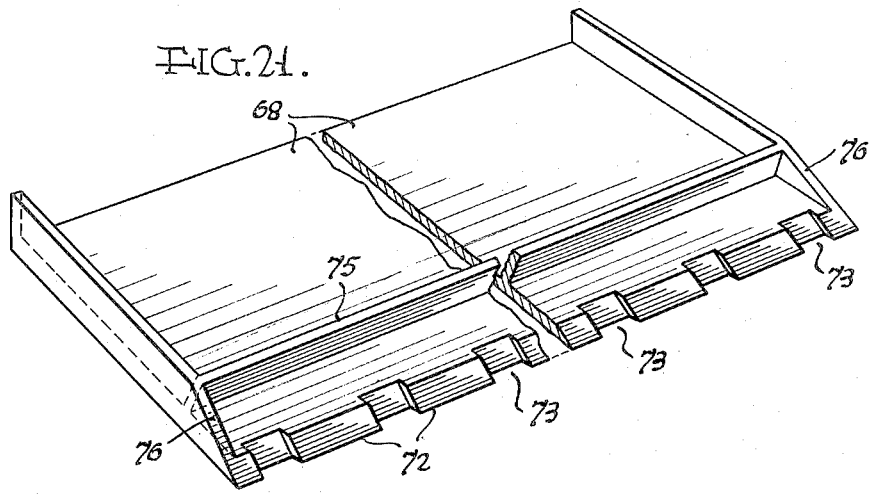
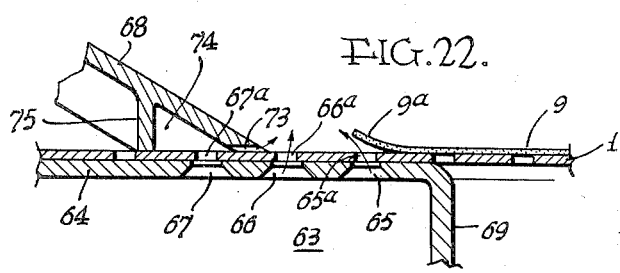
Inventor:
William J. Haessler
by his Attorneys
Howson & Howson

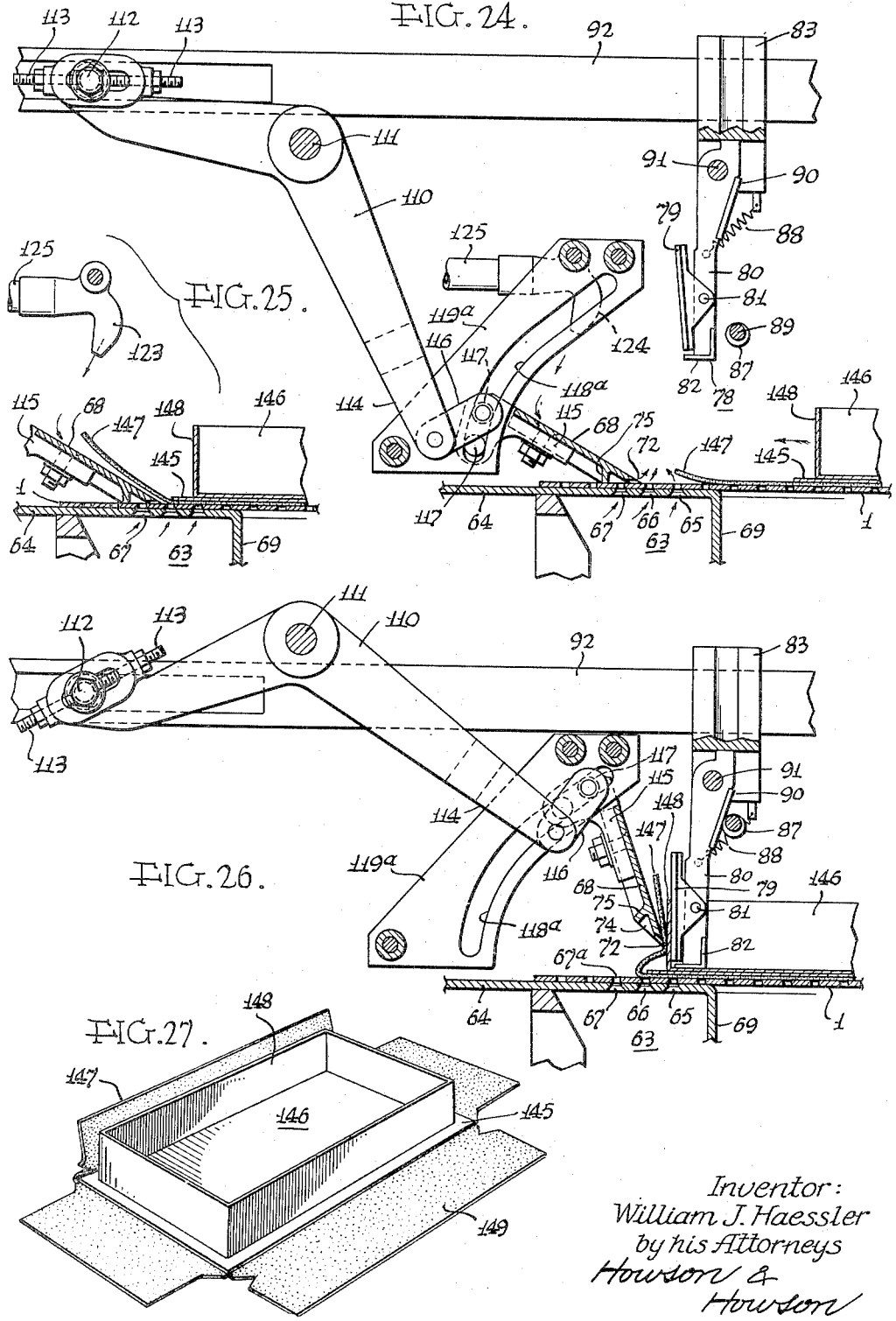

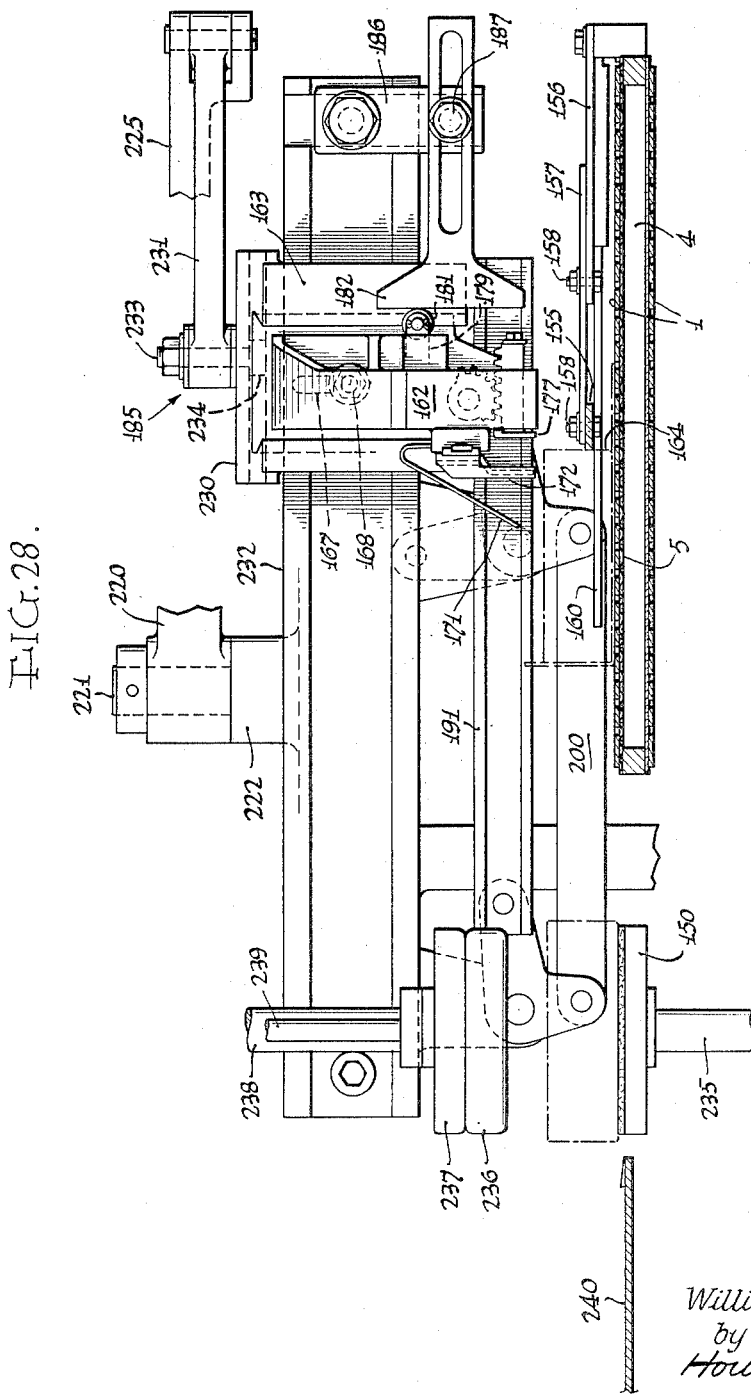

Aug. 7, 1956                W. J. HAESSLER                2,757,586
                           BOX WRAPPING MACHINE
Filed April 20, 1953                                  12 Sheets-Sheet 12
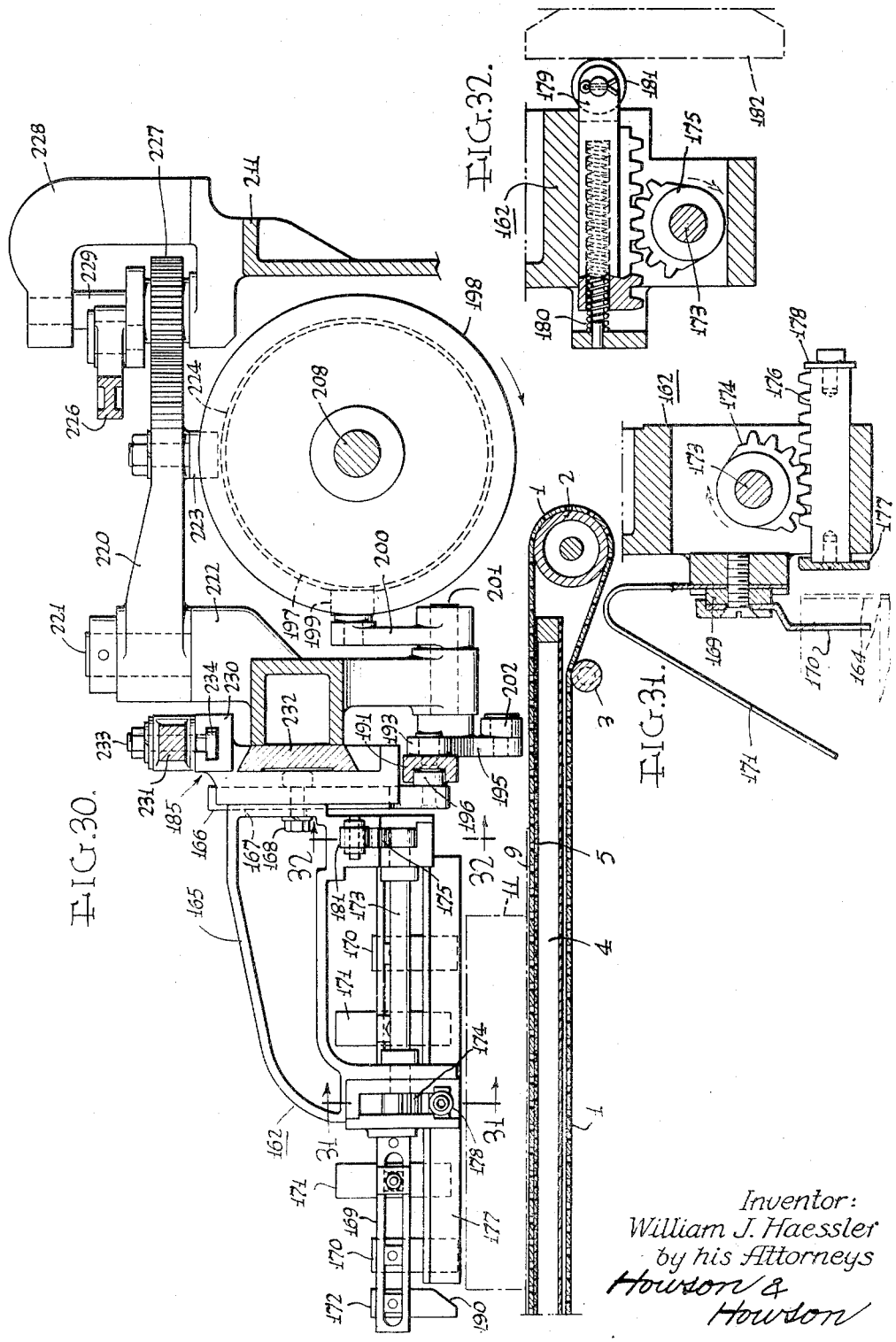
Inventor:
William J. Haessler
by his Attorneys
Howson & Howson

United States Patent Office 2,757,586
Patented Aug. 7, 1956

2,757,586

BOX WRAPPING MACHINE

William J. Haessler, Surf City, N. J., assignor, by mesne assignments, to E. G. Staude Manufacturing Company, Inc., St. Paul, Minn., a corporation of New Hampshire Original application July 12, 1950, Serial No. 173,315, now Patent No. 2,645,365, dated July 14, 1953. Divided and this application April 20, 1953, Serial No. 349,721

20 Claims. (Cl. 93—54)

This invention relates to box wrapping machinery and more particularly to improvements in such machinery which increase production and eliminate or simplify manual operation. This application is a division of application Serial No. 173,315, filed July 12, 1950, now Patent No. 2,645,365.

Box wrapping machines of the type referred to herein comprise a forming block on which the box blanks and labels are positioned in time relation to the vertical reciprocation of the forming block and the box forms which cooperate therewith. A gluer may be used to applying a coating of adhesive to the labels and to deposit them on a conveyer belt properly timed and registered so that box blanks may be either manually or automatically positioned on the labels. Cross feed mechanism then transfers the box and label from the conveyer belt to the forming block assembly. All previously known machines of this type have had one or more serious disadvantages. For example, automatic or semi-automatic machines have utilized structure for initially tacking the label to the box blank and/or for feeding the box blanks to the forming block which has not adequately provided for accurate registry and timing. As a result, frequent shutdowns have been necessitated to clear the machine. An important cause of such jamming has been due to the presence of excessive backlash and play in the drive mechanism for the various assemblies. In many plants, manual operation is used exclusively for the positioning and feeding operations to avoid the above-mentioned excessive jamming and shutdown periods.

The present apparatus overcomes the above difficulties and may be characterized as semi-automatic since in the form disclosed, an operator registers the box blank on each label. However, the accuracy of the present machine and its efficiency enable automatic registering devices for depositing the boxes on the labels to be satisfactorily employed therewith. The wrapping machine described herein includes a gluer at one end which deposits labels on a perforated vacuumized conveyer belt. These labels are carried to the operator's station where the box blanks are registered on the labels by the operator. From thence, the box blanks are pressed firmly against the labels by a tamper to insure complete adhesion between the box and the label over the bottom surface of the box. The conveyer then carries the flat labels, together with the boxes, to a positioning or tack-up station. At this point, the conveyer belt travel is momentarily interrupted and the label together with the box blank, is pushed transversely of the conveyer belt in such a manner that one edge of the label is tacked to one side of the box blank. This is accomplished by means of one or more air jets which lift a side flap of the label from the top surface of the conveyer belt, whereupon a plate or blade folds this flap of the label around the bottom edge of the box blank and presses it against the side of the box.

After the above tack-up operation has been completed, the belt starts automatically and carries the box blank with the partially applied label to a cross feed mechanism which accurately transfers the label and the box to the forming assembly transversely off of the conveyer belt. At this station, the forming block and box forms which reciprocate vertically, press the box blank and the label downwardly through a series of tools which apply all sides of the label to the box blank to complete the wrapping operation. It will be understood that the details of the gluer as well as the forming block assembly and its associated mechanism, are well known in the art.

The tamper, the tack-up assembly, the cross feed assembly, and the improved drive, represent distinct advances in the art whereby substantial increased production may be achieved. For example, it has been found entirely feasible to wrap as many as 16,000 boxes per day. Furthermore, the mechanism is such that it may be readily and quickly adjusted to accommodate different box and label sizes.

A primary object of the invention therefore, is to provide in box wrapping machinery an improved tack-up assembly for initially applying a label to a box blank.

A further object of the invention is to provide an improved cross feed assembly for a machine of the class described.

A further object is to provide suitable driving connections for the tack-up assembly and the cross feed assembly in a box wrapping machine.

A further object of the invention is to provide a novel apparatus for tacking one flap of a box label to the side of a box blank.

A further object of the invention is to provide means for pressing the box blank against the blade, said means being automatically operated in timed relation with movement of the conveyer belt.

A further object of the invention is to provide improved adjustable mechanism for a box label tack-up assembly.

A further object of the invention is to provide one or more air jets which may be selectively operated in conjunction with the tack-up assembly to assist in guiding the label onto the blade and against the box blank.

A still further object of the invention is to provide an improved mechanism for transferring a partially wrapped box blank from a conveyer belt to a finishing machine.

Referring now more particularly to the drawings:

Fig. 1 is a top view of a box wrapping machine constructed in accordance with the present invention;

Fig. 2 is a side view of the machine of Fig. 1;

Fig. 3 is an enlarged top view of the right-hand end of the structure of Fig. 1, showing the tack-up assembly and the cross feed assembly;

Fig. 4 is an enlarged fragmentary longitudinal section as seen at 4—4 of Fig. 1;

Fig. 5 is an enlarged fragmentary transverse section as seen at 5—5 of Fig. 1;

Fig. 6 is a fragmentary detail of the temper actuating linkage shown detached from its associated structure, as seen in Fig. 7;

Fig. 7 is an enlarged transverse section as seen at 7—7 of Fig. 3;

Fig. 8 is a perspective of the conveyer belt and tack-up assembly;

Fig. 9 is a fragmentary sectional detail showing part of the structure of Fig. 7 but with the tack-up mechanism in a moved position;

Fig. 10 is a fragmentary detail of the box blank and label as it is being moved transversely across the belt and onto the tack-up blade;

Fig. 11 is a detail similar to Fig. 10, but with the box blank and label in a more advanced position;

Fig. 12 is a fragmentary detail showing the actuating mechanism for the tack-up blade and presser foot;

Fig. 13 is an enlarged fragmentary sectional detail as seen at 13—13 of Fig. 7;

Fig. 14 is a view similar to Fig. 13 showing the tack-up blade in the raised position of Fig. 9;

Fig. 15 is an enlarged sectional detail as seen at 15—15 of Fig. 9;

Fig. 16 is a sectional detail as seen at 16—16 of Fig. 15;

Fig. 17 is an enlarged fragmentary detail showing the air jet structure at the tack-up station;

Fig. 18 is a transverse sectional detail as seen at 18—18 of Fig. 17;

Fig. 19 is a fragmentary sectional detail as seen at 19—19 of Fig. 7;

Fig. 20 is a sectional detail as seen at 20—20 of Fig. 7;

Fig. 21 is an enlarged perspective showing the underside of the tack-up blade;

Fig. 22 is an enlarged sectional detail of a part of the structure of Fig. 10, showing the operation of the air jets and leading edge of the tack-up blade;

Fig. 23 is a perspective of a box blank with the label tacked to one side thereof, after leaving the tack-up assembly;

Fig. 24 is a fragmentary sectional detail showing slightly modified tack-up structure adapted to handle extension edge boxes;

Fig. 25 is a fragmentary detail of a part of the structure of Fig. 24 showing the box and label in an advanced position;

Fig. 26 shows the structure of Figs. 24 and 25 in a still further advanced position;

Fig. 27 is a perspective showing an extension edge box after one side of the label has been tacked up, as illustrated in Figs. 24—26;

Fig. 28 is an enlarged transverse section as seen at 28—28 of Fig. 3;

Fig. 29 is an enlarged fragmentary sectional view as seen at 29—29 of Fig. 3;

Fig. 30 is a longitudinal sectional detail as seen at 30—30 of Fig. 3;

Fig. 31 is a fragmentary sectional detail as seen at 31—31 of Fig. 30;

Fig. 32 is an enlarged sectional detail as seen at 32—32 of Fig. 30;

Fig. 33 is an enlarged fragmentary detail showing the segmental gear and pinion of Fig. 1 in a limit position; and Fig. 34 is a view similar to Fig. 33 showing the gear and pinion in the alternate limit position.

In brief, the present invention is directed to an automatic tamper or presser for providing complete adherence of the bottom of the box to a glued label. This tamper is driven in timed relation from the tack-up assembly, comprising a pusher that operates transversely across the conveyer belt of the wrapping machine. This pusher is adjusted to contact one side of a box blank which has been adhesively applied to a box label held flatly on the belt. The travel of the pusher is so controlled that, in accordance with the width of the box blank, the opposite flap or edge of the label is transferred from a suction zone on the conveyer belt to a pressure or blast zone. This blast raises the forward edge of the label flap onto and/or above a tack-up blade that slopes gradually upward from the top surface of the belt. As the pusher continues to move the box blank and label towards the tack-up blade, the label flap is completely raised from the belt and floats above the tack-up blade. As the edge of the box reaches a position in line with the forward edge of the tack-up blade, its transverse travel is halted and the blade is pivoted to a substantially vertical position, and at the same time a backing member drops into the box blank. Further movement of the backing member and blade presses the flap to the adjacent side of the box blank so that it is either temporarily or permanently glued thereto. In the event that an extension edge box is used, the travel of the blade and the manner in which the flap is tacked to the side of the box, may be slightly modified to accommodate this type of box blank.

After the label has been adhesively secured to one side of the box blank as described above, the conveyer transfers the box and label to a subsequent station near the terminus of the belt. At the same time that the conveyer belt stops to permit the tack-up operation described above, a cross feed arm drops into position in registry with the side of the preceding box opposite the one to which the label has been previously tacked, whereupon this box is engaged by gripper mechanism on the cross feed arm at the start of the transverse movement of the arm. The box blank together with the attached label, are then moved transversely to the forming block assembly which is at one side of the belt. Suitable means on the cross feed arm are provided for ejecting wrapped boxes from the forming block in the event that a box has been missed for one reason or another. This is important because ordinarily the following box blank ejects the preceding wrapped box from the forming block. It will be apparent that accurate timing and elimination of chatter and backlash as well as overtravel in the above sequence of operations, is of especial importance. The machine to be described in more detail hereinafter, incorporates positive drive for the tack-up assembly as well as the cross feed to secure accurate timing and registry of the mechanism.

The present box wrapping machine incorporates an endless conveyer belt 1 which is perforated and driven from driving rolls in the gluer, an idler roll 2, as well as a plurality of idler rolls 3. Belt 1 runs over and seals the top of a vacuum or low pressure air duct 4 which is provided with a screen 5 at its top to support the belt 1. In accordance with conventional practice, one or more vacuum pumps or exhaust blowers (such as shown at 6) are connected to duct 4 by means of a vertical conduit 7. Blower 6 provides reduced air pressure in duct 4 to retain proper registry and flat contact with belt 1 after the gluer assembly 8 applies the paper labels 9, 9 thereto. The labels 9 are not only registered transversely on the belt but are placed thereon in spaced timed relation, in accordance with a trip mechanism (not shown) connected to the wrapping machine. Before being placed on the belt, the upper surfaces of the labels 9 are coated with a suitable adhesive in the gluer. The details of box label gluers are well known in the art and are shown and described in the Haessler Patent No. 2,368,759.

As the labels 9 proceed along with the upper ply of conveyer belt 1, they reach a station approximately midway between the gluer 8 and the wrapping machine proper 10. At this point, an operator positions a box blank 11 in the center of each label 9, as shown in Figs. 1 and 23. Suitable electrical controls (not shown) may be located at the operator's station so that the machine may be stopped and started at the operator's will. It will be understood however, that the automatic cycling of the mechanism includes momentary interruption of the belt travel so that the box blank may be positioned by the operator, as well as to permit the tack-up and cross feed mechanisms to function, as described hereinafter. After the box blanks 11 have been placed on the labels 9 by the operator, the conveyor belt 1 carries the boxes and labels to the next station whereupon the belt automatically stops in registry with a tamper or pressing assembly 13 (Figs. 4–6). This assembly comprises a frame 14 which is secured at one end to the side of duct 4 and is adjustably supported at the other end by means of a bracket 15 which supports a post 16 having adjusting nuts 17, 17. The tamping head 18 is provided with a soft resilient under surface 19 such as foam rubber, and the head 18 is mounted on a vertically reciprocating rack 20 carried in a boss or sleeve 21 on the upper part of bracket 14. A pinion 22 is adjustably secured to shaft 23 by means of nut 24 in such a way that rotation of the pinion serves to raise and lower the tamping head 18 with respect to the top of conveyer 1.

Drive for the pinion 22 is provided through a shaft 25 having a pair of universal joints 26, 26 at either end thereof. The head 18 is urged towards the raised position by means of a helical extension spring 27 anchored at one end to the bracket 14 and at the other end to shaft 23 by means of lever 28. The opposite end of the driving shaft 25 is journaled in a bracket 29 mounted on the tack-up assembly and is provided with a crank arm 30 having a pin 31 engaged in slot 32 on link 33. As will be described more fully hereinafter, the movement of link 33 is of such amplitude that the overtravel between link 33 and the pin 31 produces a relatively minor movement of the head 18. Since the operator presses one edge of the box 11 against the label 9, it is only necessary that the tamper head 18 register with the opposite or far side of the box (as shown in Fig. 5), but the head 8 can be made to press the entire box in the case of badly warped box 11. This insures that the entire bottom of the box makes complete adhesive contact with the label throughout its entire area. As soon as the tamper 18 is raised, the belt 1 again starts to carry the box and label to a subsequent station in registry with the tack-up assembly 43.

Referring now to Fig. 7, a box blank 11 is shown just prior to being moved transversely of the conveyer 1 by means of the tack-up mechanism. This tack-up assembly 43 comprises a pair of vertical standards 44, 44 which are supported on a cross member 45 of the main wrapping frame 46. A lever 47 is fulcrumed at 48 in bracket 49 and is provided with a roller cam follower 50 which operates in cam track 51 of circular cam 52. Cam 52 is mounted on shaft 53 which is driven from the main motor, in a manner to be described more fully hereinafter. The upper end of lever 47 is pivotally connected to a sliding block 54 by means of connecting link 55 pivoted to the lever 47 at 56, and to the channel 57 which is integrally secured to block 54. Suitable adjustment between the block 54 and link 55 is provided by means of nut 58 which may be loosened to move the channel 57 with respect to link 55. As shown in Figs. 3 and 7, link 55 is pivotally connected to link 33 at 33a to provide the actuating connection for the tamper. Block 54 slides horizontally on a cross member 59, which is supported on standards 44, 44 and carries a downwardly depending arm 60 to which a pusher plate 61 is attached. Plate 61 is provided with an adjustable angle bracket 62 which engages the top of box blank 11 as the pusher moves towards the box. Since the box blank 11 has been adhesively secured to the label 9, both the label and the box are moved transversely of the belt 1 by the pusher plate 61.

It will be understood that the vacuum in duct 4 provides ample suction through the perforated belt 1 to hold the boxes and labels securely to the surface of the belt, but which is insufficient to prevent their being pushed sideways across the surface of the belt. In order to break the suction so that one flap of the label may be raised from the belt and tacked to the box, I provide a relatively small pressurized duct or compartment 63 (Fig. 11) near one edge of the belt in the path of travel of the label at the tack-up station. The top of the pressurized compartment is formed of a plate 64 which is adjustably mounted on the frame and which has a series of longitudinally extending slots 65, 66 and 67 that register with certain rows of perforations in the belt 1. As the leading edge of flap 9a of label 9 is pushed over the first longitudinal row of perforations 65a that are in registry with slot 65 (Fig. 22), several jets of air raise flap 9a from the upper surface of the belt. Continued transverse movement of the box and label brings the flap 9a over the second longitudinal row of perforations 66a which are in line with slots 66 in plate 64, so that by the time the flap reaches blade 68, it has been raised well off of the surface of belt 1, not only by means of the air jets through perforations 65a and 66a but also by the air jets through the third series of slots 67 and perforations 67a. Adjustment of plate 64 not only lines up the slots in the plate with the perforations in the belt, but also serves to regulate the volume of compartment 63. For this purpose, plate 64 is bent downwardly to form a movable side 69 for the compartment (as shown in Figs. 9–11) and a suitable seal 70 is provided along the bottom edge of side 69.

Air is supplied intermittently to compartment 63 by means of a suitable blower 71 in a manner to be described more fully hereinafter. I have found that if two slots are in front of blade 68 and one slot is in back of the blade, satisfactory results may be achieved under all conditions. The adjustment of wall 69 to accomplish this result is made in accordance with the width of the boxes being run. The bottom edge 72 of blade 68 is beveled to provide a substantially tight fit against the surface of belt 1 and edge 72 has a plurality of air passages 73, 73 through which air from perforations 67a is blown from a compartment 74 formed between the top of belt 1 and walls 75, 76, 76 on the underside of blade 68.

Air under pressure in duct 63 enters chamber 74 through slots 67, 67, 67 and the row of perforations 67a, from which it is directed through passages 73, 73 into the path of the label flap 9a. The air blasts cause the flap 9a to float or ride on a cushion of air, thus preventing adherence to the surface of blade 68 for any reason. Fig. 11 shows the box 11 when it reaches the end of its transverse travel and in this position the forward side 11a of the box is substantially in registry with the edge 72 of blade 68.

When the box has reached this position, a pressure foot assembly 78 descends into the box 11, as shown in Figs. 9 and 11. Pressure foot assembly 78 comprises a backing plate 79 which is pivotally mounted on leg 80 and which is free to move with respect to the leg on pin 81. A foot 82 is likewise attached to the leg 80 and serves to press the box securely onto the top surface of belt 1. The leg 80 is pivoted to a block 83 vertically slidable on ways 84, 84 of carriage 85, that is in turn adjustably mounted on cross member 59 by means of cap screw 86. Leg 80 is pivotally urged against a roller 87 by means of spring 88 so that the transverse position of leg 80 may be adjusted as desired, by turning the eccentric stud 89 to vary the pressure between the blade and the backing plate.

Leg 80 as well as block 83 to which it is pivoted at 91, are vertically actuated by means of a cross arm 92 pivoted at each end thereof in the arms of bell cranks 93 and 94. Bell cranks 93 and 94 are in turn journaled to cross member 95, as shown in Figs. 3 and 8. A connecting rod 100 is pivotally secured to the short arms of bell cranks 93 and 94 by means of pins 101, 101. One end of connecting rod 100 is operatively secured to the upper end of walking beam 102 by means of an adjustable link 103 and clevises 104, 104. Walking beam 102 is pivoted to standard 44 at 105 and also carries a cam follower 106 which is engaged in a cam track 107 on cam 52 (Fig. 18), in a manner similar to the construction of cam follower 50 on lever 47. Figs. 10, 11, 9, 15 and 16 illustrate the above-described successive stages in the actuation of the foot assembly 78.

As shown in Fig. 12, cross arm 92 is pivotally mounted on bell cranks 93 and 94 in such a manner that arm 92 is at all times retained in a horizontal position parallel to the top of belt 1. The action of tack-up blade 68 as well as foot assembly 78, is controlled by horizontal and vertical movement of cross arm 92. A bell crank 110 is pivoted to carriage 85 at 111 and is actuated by movement of arm 92 through a pin and roller 112 on the bell crank. Roller 112 runs in channel 92a on arm 92 and is adjustable by means of screws 113, 113. The opposite end of bell crank 110 is bifurcated as shown at 114 in Fig. 13, and is connected to blade carriage 115 by means of link 116. Carriage 115 is provided with two pairs of guide rollers 117, 117 which operate in slots 118, 118 of blade guide plates 119, 119 secured to side plate 85b of carriage 85. When bell crank 110 pivots, the blade 68 moves arcuately from the position shown in Fig. 7 to the positions shown in Figs. 9 and 16. The location and curvature of slots 118, 118 is such that unless an extension edge box blank is used, the edge 72 of blade 68 remains in contact with the upper surface of belt 1. In this way there is no chance that the flap 9a of the label can pass underneath the edge 72 of the blade. A suitable scale 120 is provided on cross arm 59 in order to provide proper adjustment for carriage 85, in accordance with the width of the boxes being wrapped.

The blower 71 mounted at one side of the belt 1 is continuously driven by means of an electric motor 122. Air discharged from blower 71 is directed into duct 63 directly underneath blade 68 so that air is discharged upwardly through perforations 65a, 66a, and 67a in belt 1. The purpose of this upward air blast has been described previously in conjunction with Figs. 10, 11 and 22. In addition to the air jets directed upwardly from duct 63, air is supplied to nozzles 123 and 124 through conduits 125, 125 which are connected to a valve assembly 126. A cam 127 on shaft 53 (Fig. 18) actuates a lever 128 pivoted to bracket 49 at 130 by means of cam follower 127a. Lever 128 is connected to control rod 131 through clevis 132 and to bell crank 133 which is in turn positioned to actuate valve rod 134. Rod 134 carries a valve 135 at one end which closes the intake to blower 71 when rod 134 is moved axially to the left by means of springs 136 and 137 (shown in Fig. 17). This movement of rod 134 not only interrupts the supply of air under pressure to duct 63, but also disconnects conduit 138 from air pressure line 139 so that the air jets from nozzles 123 and 124 are likewise interrupted. The portion of valve housing 126a in which valve rod 134 rides is vented by means of a port 126b. The timing of the air jets from duct 63 as well as from nozzles 123 and 124 is such that the flap 9a of the label 9 is retained in a raised position so that in the event any glue might adhere to the face of the blade, there is no likelihood that the flap 9a could be wrinkled or folded underneath itself as the box and label are moved transversely on the conveyer.

When labels are applied to extension edge box blanks, that is boxes having a flange around their bottom edges, the actuation of the blade is slightly modified in two respects. First, it is important that the extension edge 145 on box 146 (Fig. 24) be permitted to travel underneath blade 68 so that the blade can tack-up the flap 147 to the side 148 of the box blank. Second, the tools (not shown) of the wrapping assembly must be enabled to disconnect the label flap 147 from the box side 148 in order that the bend in the label 149 formed at the junction of the extension edge 145 and side 148 may be properly glued to the box. Since it is not feasible to have the blade 68 perform this function, it is desirable in wrapping extension edge boxes to make sure that the flap 147 of the label is only tacked to the side 148 of the box blank with sufficient adhesion to keep the flap 147 in an upright position until the label and blank are properly positioned on the forming block 150.

Figs. 24–26 show the modified blade action used in conjunction with the extension edge box 146 of Fig. 27. This may be accomplished by substituting a modified carriage assembly which has blade guide plates 119a, 119a in which the slots 118a raise the blade 68 in the upper portion of its travel so that the edge 72 of the blade is well above the upper surface of the conveyor belt (shown in Fig. 26). Adjustment of bell crank 110 by means of adjusting screws 113, 113 is readily made to accommodate different widths of flanges or extension edges on the boxes. Furthermore, the contour of the tracks 118a in blade guide plates 119a is such that the lower edge 72 of the blade is retained above the upper surface of conveyer belt 1. Also, a slight tilt is imparted to the blade when raised so that the pressure area between flap 147 and side 148 is limited to a narrow horizontal strip along the side of box 146. In other respects, the operation of the tack-up assembly is the same for both types of box blanks.

After the leading flap 9a or 147 has been tacked to one side of the box blank as just described, the conveyer 1 is automatically started to carry the partially glued box and label to the cross feed station near the terminus of the belt. It is important that the box blanks be delivered to the correct location transversely of the conveyer belt in accordance with the stroke of the cross feed mechanism and the width of the boxes. For this purpose, a guide arm 155 is supported on a bracket 156 by means of a slotted plate 157, is both longitudinally and transversely adjustable thereon by means of bolts 158, 158. The forward end 159 of guide arm 155 also serves as a limit stop for properly locating the box blanks at the tack-up station. After the tack-up operation, the boxes are delivered by means of arm 155 to the cross feed station (Fig. 3) and the box travel is arrested by a limit stop 160 which is adjustably mounted on bracket 161. As seen in Fig. 3, it will be apparent that the length of limit stop 160 is such that the tacked up flap always clears the end of the limit stop to avoid any interference therebetween.

When a box blank is suitably positioned against limit stop 160, the gripper head assembly 162 moves downwardly in ways 163 to engagement position with the side 164 of the box, preparatory to pushing it transversely off the conveyer 1. The gripper head assembly 162 comprises a bracket 165 to which a plate 166 is adjustably secured. Plate 166 is slotted at 167 and relative movement of the plate with respect to the gripper head assembly 162 is achieved by means of loosening cap screw 168. This adjustment is made to accommodate boxes of various depths. Bracket 165 carries an arm 169 which is longitudinally slotted and provided with a plurality of gripper fingers 170, 170, a plurality of kickers 171, 171, and an aligning finger 172. A shaft 173 is carried in general alignment with arm 169 and is journaled in bracket 165 at either end. Shaft 173 carries at either end a pair of oppositely facing segmental pinions 174 and 175 (Figs. 31 and 32). Outboard pinion 174 then cooperates with a horizontally slidable rack 176 which has a gripper plate 177 at one end thereof and a limit stop 178 at the opposite end. Pinion 175 is driven by a spring-loaded rack 179 which is drilled to receive a helical compression spring 180 and is provided with a roller 181 that contacts the gripper actuating bracket 182 when the cross feed head nears the end of its return stroke.

Referring to Figs. 28, 30–32, when the cross fed assembly 185 moves to the right (as shown in Fig. 28) roller 181 contacts the face of actuating arm 182 which is adjustably supported on bracket 186 by means of bolt 187. Continued movement of the cross feed assembly moves rack 179 to the left (as seen in Fig. 32) which in turn pivots shaft 173 in a counterclockwise direction. This counterclockwise rotation of shaft 173 retracts the gripper plate 177 due to counterclockwise rotation of pinion 174 and right-hand movement of rack 176. In this position, there is substantial clearance between gripper fingers 170 and gripper plate 177. The gripper head assembly is then lowered by mechanism to be described more fully hereinafter, so that the edge 164 of the box blank is positioned between 170 and the gripper plate 177 (shown in Fig. 31).

Because it is important that the box blank and label be accurately positioned with regard to the gripper head assembly 162, the biased edge 190 of finger 172 serves to align the box accurately in the event that it has bounced back from limit stop 160.

The gripper head assembly 162 is actuated vertically in ways 163 by means of channel 191 which is pivotally mounted on arms 192 and 193 of bell cranks 194 and 195 respectively, (Fig. 29). Roller 196 is secured to the bottom of plate 166 and when channel 191 is raised and lowered, roller 196 runs in the track of the channel 191. Actuation of bell cranks 194 and 195 is accomplished by a cam track 197 in barrel cam 198. Cam track 197 controls cam follower 199 mounted on arm 200 which in turn pivots bell crank 195 through shaft 201. Thus, both bell cranks 194 and 195 are simultaneously turned through tie rod 202 with which they are connected. Since the entire gripper head assembly must reciprocate horizontally, roller 196 is free to move longitudinally in channel 191 regardless of the elevation of the channel.

The actuating mechanism for the cross feed is driven from the main shaft 205 (Fig. 3) by means of a pair of miter gears 206, 207 and cross shaft 208 which is journaled at 209 and 210 in frame member 211. Barrel cam 198 is keyed to shaft 208 and the shaft extends through frame 211 to provide suitable driving connections for the tack-up assembly. This is accomplished by means of miter gears 212, 213, a vertical stub shaft 214, an angle gear box 215, and shaft 53. The positive drive for the cross feed and tack-up assembly by means of gears and shafting of adequate dimensions, is an important feature in securing accurate timing of the mechanism. Heretofore, this has been a serious disadvange of wrapping machines because of excessive play and backlash.

The cross feed drive is accomplished by means of a segmental gear 220 which reciprocates on shaft 221 mounted in frame member 222 (Figs. 30, 33 and 34). Segmental gear 220 carries a cam follower 223 which runs in cam track 224 of cam 198 (as shown clearly in Fig. 29). Reciprocation of gear 220 causes lever arm 225 to oscillate in a horizontal plane by means of a drag link 226 which is connected to spur gear 227 through crank arm 227a. Gear 227 reciprocates back and forth in accordance with the movement of gear 220 and is pivotally mounted in bracket 228 on shaft 229. Lever 225 is connected to the cross head 230 on the cross feed assembly 185 by means of a connecting link 231 and is pivoted to the frame at 225a. Cross head 230 is adapted to reciprocate horizontally on ways 232 in accordance with the movement imparted to it through link 231. Suitable adjustment for the transverse positioning of the cross feed assembly is provided by means of a bolt 233 having a head 234 slidable in a T-slot of the cross head 230 (Fig. 30).

An important feature of the driving connections described above is illustrated in Figs. 33 and 34 which show segmental gear 220 and its associated pinion 227 in opposite limit positions. It will be noted that in each limit position corresponding to a time when the conveyer belt 1 is stationary, the centers of shaft 229, pin 226a and pin 226b are substantially in a straight line. This timing securely locks the cross feed assembly and provides a minimum of lost motion as well as accurate positioning and timing.

As previously described, when the cross feed assembly 185 approaches the right-hand limit (Fig. 28) of its transverse travel, roller 181 contacts the face of bracket 182 to retract gripper plate 177 so that the side of the box may be inserted between fingers 170 and the plate 177. When the gripper head assembly has reached the proper point in its transverse travel, the head is lowered by suitable turning of cam 197 and cam follower 199. In this position, the entire assembly is moved transversely on ways 232 by action of barrel cam 198 and cam follower 223. As soon as the assembly has moved sufficiently far to the left (as seen in Fig. 28) roller 181 ceases to contact stop 182 and then spring 180 pivots shaft 173 so that the gripper plate 177 securely clamps the box blank side against gripper fingers 170, 170. Continued transverse travel of the gripper head assembly on ways 232 ultimately positions the box blank and label on the forming block 150 which is supported on a vertically reciprocating plunger 235.

When the box blank is properly positioned on block 150, the box forms 236 and 237 are urged downwardly by means of plungers 238, 239 so that the box blank is pressed tightly on block 150 and stripped from between the fingers 170 and plate 177. The label is then completely glued to the box blank by means of tools (not shown) whereupon the block 150 rises to the position shown in Fig. 28 with the completely glued box resting thereon. As the cross feed assembly brings the next box blank transversely towards the forming block 150, the succeeding box contacts the previously wrapped box on block 150 and pushes it sideways onto platform 240. However, if for any reason there has been a skip in the regular succession of box blanks, there might not be a succeeding box to remove the formerly wrapped box from the block 150. In this event, the next reciprocation of the formers 236 and 237 would smash the previously wrapped box on the block, so that the box that has previously been wrapped must always be removed from block 150, regardless of whether there is a succeeding box in the cross feed assembly. For this purpose, kickers 171, 171 on arm 169 push the preceding wrapped box from block 150 and out of the path of the formers 236 and 237 in the event there is no succeeding box in the gripper head. This not only saves the waste of a completely wrapped box in the event there is a skip in the wrapping operation, but it also eliminates the necessity of shutting down the machine to remove the remnants of a box which would otherwise be jammed in the forming assembly.

The box formers or plungers 238, 239 are actuated by means of levers 241 and 241a pivoted on frame member 242. The levers are in turn operatively associated with barrel cam 243 which is driven from the main motor (not shown). It will be understood however, that this structure is well known in the art.

I have thus provided an improved box wrapping machine which is relatively inexpensive to manufacture and which enables increased production to be achieved. The timing and operation of the machine render it suitable to full automatic operation, and time lost due to jamming and consequent shutdowns is reduced to a minimum.

Having thus described my invention, I claim:

1. A tack-up assembly for box wrapping machines, having a conveyor belt on which labels and box blanks are positioned, comprising a pusher laterally movable across the surface of said conveyor belt for pushing boxes with assembled labels into label tacking position, a support for said pusher, means for reciprocating said pusher transversely back and forth across said belt, a blade positioned on the top of said belt in lateral alignment with the path of said pusher and in position to underlie the flap of a box label pushed thereover by said pusher, means for raising a box flap from said conveyor into a position overlying said blade, and means for pivoting said blade from an initial sloping position to a raised position whereby the flap of a box label is further raised and tacked to the side of a box blank with which it is pushed into tacking position with said label by said pusher.

2. A tack-up assembly for box wrapping machines, having a conveyor belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a blade positioned on the top of said belt in lateral alignment with the path of said pusher and in position to underlie the flap of a box label pushed thereover by said pusher, a bracket on which said blade is mounted, said bracket having at least one arcuate slot therein, guide means attached to the blade and adapted to move in said slot, and a lever for moving the blade and guide means in the slot in timed relation to the movement of the pusher and the conveyor belt, whereby to raise the flap of a box label overlying said pusher and tack it to the side of a box blank associated therewith.

3. A tack-up assembly for box wrapping machines, having a conveyer belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a blade positioned on the top of said belt and in lateral alignment with the path of said pusher and in position to underlie the flap of a box label pushed thereover by said pusher, a bracket on which said blade is mounted, said bracket having at least one arcuate slot therein, guide means attached to the blade and adapted to move in said slot, means for pivoting said blade from an initial sloping position to a raised position in accordance with movement of the pusher, and at least one air jet directed into a zone adjacent the edge of the blade, and means for timing the action of said air jet and the pivoting of said blade, whereby the flap of a box label is raised from the surface of the belt by said air jet to overlie said blade, thereafter further raised by pivoting of said blade and tacked to the side of a box blank.

4. A tack-up assembly for box wrapping machines, having a conveyer belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a blade positioned on the top of said belt and in lateral alignment with the path of said pusher and in position to underlie the flap of a box label pushed thereover by said pusher, a bracket on which said blade is mounted, said bracket having at least one arcuate slot therein, guide means attached to the blade and adapted to move in said slot, walls defining a gas pressure compartment on the under surface of said blade, at least one orifice along the front forward edge of said blade for directing gas from said compartment in a direction towards the pusher, a pressure duct underneath the belt in a zone adjacent the blade, and means for directing gas against said blank and moving said blade into tacking position against a side of the box blank, whereby the flap is first raised into position overlying said blade, and then tacked against the box blank by movement of said blade.

5. A tack-up assembly for box wrapping machines, having a conveyer belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a blade positioned on the top of said belt and in lateral alignment with the path of said pusher and in position to underlie the flap of a box label pushed thereover by said pusher, a bracket on which said blade is mounted, said bracket having at least one arcuate slot therein, guide means attached to the blade and adapted to move in said slot, means for pivoting said blade from an initial sloping position to a raised position, a gas pressure duct underneath the belt between the blade and the pusher, walls defining a plurality of vertical passage in the top of said duct for directing gas jets into a zone in front of the blade and between the blade and the pusher, at least one gas jet positioned above the blade and adapted to direct a jet of gas downwardly onto the upper surface of the blade, and means for introducing gas to said jets and duct under elevated pressure, in timed relation to lateral movement of said box blank and label by said pusher, whereby the flap of a label is first raised by said gas into a position overlying said blade and thereafter tacked against the box blank by movement of said blade.

6. A tack-up assembly for box wrapping machines, having a conveyer belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a blade positioned on the top of said belt and in lateral alignment with the path of said pusher and in position to underlie the flap of a box label pushed thereover by said pusher, a bracket on which said blade is mounted, said bracket having at least one arcuate slot therein, guide means attached to the blade and adapted to move in said slot, means for pivoting said blade from an initial sloping position to a raised position, a gas pressure duct underneath the belt between the blade and the pusher, walls defining a plurality of vertical passages in the top of said duct for directing gas jets into a zone in front of the blade and between the blade and the pusher, at least one gas jet positioned above the blade and adapted to direct a jet of gas downwardly onto the upper surface of the blade, and means for intermittently actuating said gas-introducing means in timed relation with the movement of the blade, conveyer and pusher, whereby the flap of a label is first raised by said gas into a position overlying said blade and thereafter tacked against the box blank by movement of said blade.

7. A tack-up assembly for box wrapping machines having a perforated conveyer belt on which labels and box blanks are positioned, comprising a pusher laterally movable across the surface of said conveyer belt for pushing boxes with assembled labels into label tacking position, a cam controlled lever for actuating said pusher, a shaft for actuating said lever, a blade positioned above the surface of said belt, a support for said blade, a second cam controlled lever operated by the shaft, connections between said second lever and the blade whereby movement of the lever raises the blade from an initial sloping position to an elevated position, a vacuum duct extending underneath the conveyer belt in a zone traversed by the pusher, a pressure duct underneath the conveyer belt in a zone adjacent the blade, means for introducing gas under elevated pressure into said pressure duct, and cam controlled means driven by the shaft for intermittently elevating the gas pressure in the pressure duct in timed relation to movement of the pusher and the blade, whereby the flap of a label is first raised by said gas into a position overlying said blade and thereafter tacked against the box blank by movement of said blade.

8. Apparatus in accordance with claim 7, in which the top of the pressure duct comprises a slotted plate, and means for laterally adjusting the position of said plate to register the slots with perforations in the belt.

9. Apparatus in accordance with claim 7, in which the means for intermittently introducing the gas under elevated pressure into the pressure duct comprises a blower having an air intake, and a cam actuated valve for closing said air intake.

10. A tack-up assembly for box wrapping machines, having a conveyer belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a blade positioned on the top of said belt and in lateral alignment with the path of said pusher and in position to underlie the flap of a box label pushed thereover by said pusher, means for pivoting said blade from an initial sloping position to a raised position whereby the flap of a box label is raised from the surface of the belt and tacked to the side of a box blank, a presser foot adapted to descend vertically into the box blank in alignment with the blade, a support for said presser foot, and means for vertically reciprocating said presser foot in timed relation with the pusher and the blade to insert said presser foot into said box immediately before said blade is moved to raised position.

11. A tack-up assembly for box wrapping machines, having a conveyer belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a blade positioned on the top of said belt and in lateral alignment with the path of said pusher, a bracket on which said blade is mounted, said bracket having at least one arcuate slot therein, guide means attached to the blade and adapted to move in said slot, means for pivoting said blade from an initial sloping position to a raised position, a gas pressure duct underneath the belt in a zone adjacent the blade, walls defining a plurality of vertical passages in the top of said duct for directing gas jets into a zone in front of the blade and between the blade and the pusher, at least one gas jet positioned above the blade and adapted to direct a jet of gas downwardly onto the upper surface of the blade, means for introducing gas to said jets and duct under elevated pressure, a presser foot adapted to descend vertically into the box blank in alignment with the blade, a support for said presser foot, and means for vertically reciprocating said presser foot in timed relation with the pusher and the blade, said pusher, gas jets, presser foot and blade being timed to raise said flap by the action of the gas to a position overlying said blade, to insert said presser foot into said box and therefter to raise said blade to label tacking position.

12. A tack-up assembly for box wrapping machines, having a conveyer belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a blade positioned on the top of said belt and in lateral alignment with the path of said pusher and in position to underlie the flap of a box label pushed thereover by said pusher, means for pivoting said blade from an initial sloping position to a raised position whereby the flap of a box label is raised from the surface of the belt and tacked to the side of a box blank, a presser foot assembly comprising a support for said foot assembly, a block vertically slidable in said support, a leg pivoted in said block, a backing plate pivotally mounted near the bottom of said leg, a pressure foot on said leg, means for laterally adjusting the leg with respect to the block, and means for moving said presser foot into successively received box blanks immediately prior to movement of said blade into a raised position.

13. A tack-up assembly for box wrapping machines, having a conveyer belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a blade positioned on the top of said belt and in lateral alignment with the path of said pusher and in position to underlie the flap of a box label pushed thereover by said pusher, a bracket on which said blade is mounted, said bracket having at least one arcuate slot therein, guide means attached to the blade and adapted to move in said slot, means for pivoting said blade from an initial sloping position to a raised position, a gas pressure duct underneath the belt in a zone adjacent the blade, walls defining a plurality of vertical passages in the top of said duct for directing gas jets into a zone in front of the blade and between the blade and the pusher, at least one gas jet positioned above the blade and adapted to direct a jet of gas downwardly onto the upper surface of the blade, means for introducing gas to said jets and duct under elevated pressure, a presser foot comprising a support, a block vertically slidable in said support, a leg pivoted in said block, a cam for laterally adjusting the position of said leg with respect to said block, a backing plate pivotally mounted on the bottom of said leg, a pressure foot on said leg, and spring means for retaining said leg in position against said cam, said gas jets, pusher, blade and presser foot being timed to raise said flap by the action of the gas to a position overlying said blade, to insert said presser foot into said box and thereafter to raise said blade to label tacking position.

14. A tack-up assembly for box wrapping machines, comprising a perforated conveyer belt, a vacuum duct under a portion of said conveyer belt, a pressure duct under a lateral portion of said conveyer belt, a supporting structure straddling said conveyer belt in line with said pressure duct, a pusher plate slidably mounted on said supporting structure for pushing boxes with assembled labels into label tacking position, means on said pusher plate for engaging the side of a box blank, a lever pivotally mounted at one side of the conveyer belt, connecting means between said lever and the pusher plate, means for actuating said lever in timed relation with movement of the conveyer belt, a pair of bell cranks pivotally mounted on said supporting structure, a connecting link between said bell cranks, a second lever pivotally mounted adjacent the conveyer belt, a connection between said second lever and said connecting link for the bell cranks, means for pivoting said second lever in timed relation with movement of the conveyer belt, a bracket mounted on said supporting structure, vertical ways on said bracket, a block slidable in said ways, a horizontal arm slidably engaging said block and connected to each of the bell cranks for imparting vertical movement to the block, a leg pivotally secured to said block, a backing plate pivotally mounted on said leg, a presser foot at the bottom of said leg, at least one slotted guide secured to said bracket, a bell crank pivotally mounted on said bracket, a connection between said bell crank and the horizontal arm, a blade positioned near one edge of the belt and in position to underlie the flap of a box label pushed thereover by said pusher, a supporting member on which said blade is mounted, means on said supporting member for slidably engaging the slot in said guide, and a connection between the bell crank and the supporting member for pivoting the blade, said actuating means for said pusher plate, presser foot and blade being timed first to move the assembled box and label into position in which the label flap overlies the blade, then to move the presser foot downwardly into the box blank and then to pivot the blade into label tacking position.

15. A tack-up assembly for box wrapping machines, comprising a perforated conveyer belt, a vacuum duct under a portion of said conveyer belt, a pressure duct under a lateral portion of said conveyer belt, a supporting structure straddling said conveyer belt in line with said pressure duct, a pusher plate slidably mounted on said supporting structure for pushing boxes with assembled labels into label tacking position, means on said pusher plate for engaging the side of a box blank, a lever pivotally mounted at one side of the conveyer belt, connecting means between said lever and the pusher plate, means for actuating said lever in timed relation with movement of the conveyer belt, a pair of bell cranks pivotally mounted on said supporting structure, a connecting link between said bell cranks, a second lever pivotally mounted adjacent the conveyer belt, a connection between said second lever and said connecting link for the bell cranks, means for pivoting said second lever in timed relation with movement of the conveyer belt, a bracket mounted on said supporting structure, vertical ways on said bracket, a block slidable in said ways, a horizontal arm slidably engaging said block and connected to each of the bell cranks for imparting vertical movement to the block, a leg pivotally secured to said block, a backing plate pivotally mounted on said leg, a presser foot at the bottom of said leg, at least one slotted guide secured to said bracket, a bell crank pivotally mounted on said bracket, a connection between said bell crank and the horizontal arm, a blade positioned near one edge of the belt and in position to underlie the flap of a box label pushed thereover by said pusher, a supporting member on which said blade is mounted, means on said supporting member for slidably engaging the slot in said guide, a connection between the bell crank and the supporting member for pivoting the blade, a gas pressure duct underneath the belt in a zone adjacent the blade, walls defining a plurality of vertical passages in the top of said duct for directing gas jets into a zone in front of the blade and between the blade and the pusher, at least one gas jet positioned above the blade and adapted to direct a jet of gas downwardly onto the upper surface of the blade, a blower for introducing gas under elevated pressure into the duct, a cam actuated valve for intermittently closing the intake to said blower in timed relation with movement of the conveyer belt, and a valve for intermittently opening the jet in timed relation to movement of the conveyer belt, the pusher, gas jets, presser foot and blades being timed in their operation to move the assembled box and label into position in which the label flap overlies the blade, then to move the presser foot downwardly into the box blank and then to pivot the blade into label tacking position.

16. A tack-up assembly for box wrapping machines, comprising a perforated conveyer belt, a vacuum duct under a portion of said conveyer belt, a pressure duct under a lateral portion of said conveyer belt, a supporting structure straddling said conveyer belt in line with said pressure duct, a pusher plate slidably mounted on said supporting structure for pushing boxes with assembled labels into label tacking position, means on said pusher plate for engaging the side of a box blank, a lever pivotally mounted at one side of the conveyer belt, adjustable connecting means between said lever and the pusher plate, means for actuating said lever in timed relation with movement of the conveyer belt, a pair of bell cranks pivotally mounted on said supporting structure, a connecting link between said bell cranks, a second lever pivotally mounted adjacent the conveyer belt, an adjustable connection between said second lever and said connecting link for the bell cranks, means for pivoting said second lever in timed relation with movement of the conveyer belt, a laterally adjustable bracket mounted on said supporting structure, vertical ways on said bracket, a block slidable in said ways, a horizontal arm slidably engaging said block and connected to each of the bell cranks for imparting vertical movement to the block, a leg pivotally secured to said block, means for adjusting the lateral position of said leg with respect to the block, a backing plate pivotally mounted on said leg, a presser foot at the bottom of said leg, at least one slotted guide secured to said adjustable bracket, a bell crank pivotally mounted on said bracket, an adjustable connection between said bell crank and the horizontal arm, a blade positioned near one edge of the belt and in position to underlie the flap of a box label pushed thereover by said pusher, a supporting member on which said blade is mounted, means on said supporting member for slidably engaging the slot in said guide, and a connection between the bell crank and the supporting member for pivoting the blade, the pusher, presser foot and blade being timed in their operation to move the assembled box and label into position in which the label blank overlies the blade, then to move the presser foot downwardly into the box flap and then to pivot the blade into label tacking position.

17. As a sub-combination in a box wrapping machine having a conveyer belt and box forming mechanism, a pusher laterally movable across the surface of said conveyer belt for pushing boxes with assembled labels into label tacking position, a support for said pusher, means for reciprocating said pusher transversely back and forth across said belt, a blade positioned on the top of said belt and in lateral alignment with the path of said pusher and in position to underlie the flap of a box label pushed thereover by said pusher, means for pivoting said blade from an initial sloping position to a raised position whereby the flap of a box label is raised from the surface of the belt and tacked to the side of a box blank, a limit stop positioned over the surface of the conveyer for longitudinally positioning box blanks at the tack-up assembly station, horizontal ways, a frame in which said horizontal ways are supported, said frame being located in longitudinal spaced relation with the pusher, a cross head slidable on said ways, a gripper head assembly vertically movable in said cross head, means for reciprocating said cross head in timed relation to movement of the conveyer belt, and an adjustable bracket for guiding tacked-up box blanks from a position adjacent the blade to a position adjacent the gripper head assembly, the pusher and blade being timed to raise said flap to a position overlying said blade and thereafter to raise said blade to label tacking position.

18. A tack-up assembly for box wrapping machines, having a conveyer belt on which labels and box blanks are positioned, comprising a pusher laterally movable across the surface of said conveyer belt for pushing boxes with assembled labels into label tacking position, a support for said pusher, means for reciprocating said pusher transversely back and forth across said belt, a bracket supported over the conveyer belt in advance of the tack-up assembly, a vertically reciprocating tamper mounted in said bracket, a shaft connecting the tamper and the means for reciprocating the pusher whereby the tamper is vertically reciprocated in timed relation with actuation of the pusher, a blade positioned on the top of said belt and in lateral alignment with the path of said pusher and in position to underlie the flap of a box label pushed thereover by said pusher, means for pivoting said blade from an initial sloping position to a raised position whereby the flap of a box label is raised from the surface of the belt and tacked to the side of a box blank, a presser foot adapted to descend vertically into the box blank in alignment with the blade, a support for said presser foot, and means for vertically reciprocating said presser foot in timed relation with the pusher and the blade, the operation of said tamper, pusher and blade being timed to press the box blanks against the labels by operation of said tamper, thereafter to push the assembled boxes and labels laterally of the conveyer belt into position in which the label flap overlies the blade, and thereafter to pivot the blade upwardly into label tacking position.

19. A tack-up assembly for box wrapping machines, comprising a perforated conveyer belt, a vacuum duct under a portion of said conveyer belt, a pressure duct under a lateral portion of said conveyer belt, a supporting structure straddling said conveyer belt in line with said pressure duct, a pusher plate slidably mounted on said supporting structure for pushing boxes with assembled labels into label tacking position, means on said pusher plate for engaging the side of a box blank, a lever pivotally mounted at one side of the conveyer belt, adjustable connecting means between said lever and the pusher plate, a bracket supported over the conveyer belt in advance of the tack-up assembly, a vertically reciprocating tamper mounted in said bracket, a shaft connecting the tamper and the adjustable connecting means between the lever and the pusher plate whereby the tamper is vertically reciprocated in timed relation with actuation of the pusher, means for actuating said lever in timed relation with movement of the conveyer belt, a pair of bell cranks pivotally mounted on said supporting structure, a connecting link between said bell cranks, a second lever pivotally mounted adjacent the conveyer belt, an adjustable connection between said second lever and said connecting link for the bell cranks, means for pivoting said second lever in timed relation with movement of the conveyer belt, a laterally adjustable bracket mounted on said supporting structure, vertical ways on said bracket, a block slidable in said ways, a horizontal arm slidably engaging said block and connected to each of the bell cranks for imparting vertical movement to the block, a leg pivotally secured to said block, means for adjusting the lateral position of said leg with respect to the block, a backing plate pivotally mounted on said leg, a presser foot at the bottom of said leg, at least one slotted guide secured to said adjustable bracket, a bell crank pivotally mounted on said bracket, an adjustable connection between said bell crank and the horizontal arm, a blade positioned near one edge of the belt and in position to underlie the flap of a box label pushed thereover by said pusher, a supporting member on which said blade is mounted, means on said supporting member for slidably engaging the slot in said guide, and a connection between the bell crank and the supporting member for pivoting the blade, the operation of the said tamper, said pusher, said presser foot and said blade being timed to press the box blanks against the labels by operation of said tamper, thereafter to push the assembled boxes and labels laterally of the conveyer belt into position in which the label flap overlies the blade, thereafter to move the presser foot downwardly into the box blank, and then to pivot the blade into label tacking position.

20. A tack-up assembly for box wrapping machines, having a conveyer belt on which labels and box blanks are positioned, comprising a pusher laterally movable across the surface of said conveyor belt for pushing boxes with assembled labels into label tacking position, a blade positioned on the top of said belt in lateral alignment with the path of said pusher and underlying the position of an advancing flap of a box label as pushed transversely of said conveyor by said pusher, and means for pivoting said blade from an initial sloping position underlying the box label flap as pushed thereover by said pusher to a raised position in which the flap of the box label is further raised and tacked to the side of the box blank.

References Cited in the file of this patent

UNITED STATES PATENTS

| | | |
|---|---|---|
| 2,075,605 | Fleischer et al. | Mar. 30, 1937 |
| 2,262,788 | Bailey | Nov. 18, 1941 |